United States Patent
Chen et al.

(10) Patent No.: US 9,686,788 B2
(45) Date of Patent: Jun. 20, 2017

(54) SUBFRAME CONFIGURATIONS FOR LTE TDD SYSTEMS

(71) Applicant: QUALCOMM Incorporated, San Diego, CA (US)

(72) Inventors: Shuping Chen, Beijing (CN); Yan Li, Beijing (CN); Mingkai Nan, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/410,506

(22) PCT Filed: Aug. 2, 2013

(86) PCT No.: PCT/CN2013/080709
§ 371 (c)(1),
(2) Date: Dec. 22, 2014

(87) PCT Pub. No.: WO2014/019543
PCT Pub. Date: Feb. 6, 2014

(65) Prior Publication Data
US 2015/0327263 A1    Nov. 12, 2015

(30) Foreign Application Priority Data

Aug. 3, 2012  (WO) .................. PCT/CN12/79623

(51) Int. Cl.
*H04W 72/04*    (2009.01)
*H04W 74/08*    (2009.01)
*H04W 16/14*    (2009.01)
*H04L 5/14*     (2006.01)
*H04L 5/00*     (2006.01)

(52) U.S. Cl.
CPC ......... *H04W 72/0446* (2013.01); *H04L 5/005* (2013.01); *H04L 5/1469* (2013.01);
(Continued)

(58) Field of Classification Search
CPC ............. H04W 16/14; H04W 72/0413; H04W 72/0446; H04W 74/0833
(Continued)

(56) References Cited

U.S. PATENT DOCUMENTS

2008/0144612 A1*  6/2008  Honkasalo .............. H04L 12/66
                                                        370/370
2009/0190547 A1*  7/2009  Shi ...................... H04W 72/005
                                                        370/330
(Continued)

FOREIGN PATENT DOCUMENTS

CN    101415189 A    4/2009
CN    101431364 A    5/2009
(Continued)

OTHER PUBLICATIONS

International Search Report and Written Opinion—PCT/CN2012/079623—ISA/EPO—May 9, 2013.
(Continued)

*Primary Examiner* — Stephen J Clawson
(74) *Attorney, Agent, or Firm* — Patterson & Sheridan, L.L.P (57) ABSTRACT

Certain aspects of the present disclosure propose techniques for transmitting uplink transmissions in special subframes for LTE TDD systems. Certain aspects provide a method that generally includes determining a region of uplink transmissions in uplink pilot timeslot (UpPTS), wherein the UpPTS comprises three or more symbols allocated for uplink transmissions, and transmitting in the UpPTS.

40 Claims, 9 Drawing Sheets

(52) U.S. Cl.
CPC ....... *H04W 16/14* (2013.01); *H04W 72/0413* (2013.01); *H04W 74/0833* (2013.01); *H04L 5/0007* (2013.01); *H04L 5/0044* (2013.01); *H04L 5/0069* (2013.01); *H04L 5/0073* (2013.01)

(58) Field of Classification Search
USPC .......................................................... 370/280
See application file for complete search history.

(56) References Cited

U.S. PATENT DOCUMENTS

| | | | |
|---|---|---|---|
| 2010/0238847 | A1 | 9/2010 | Suo et al. |
| 2010/0296451 | A1* | 11/2010 | Li .................... H04W 74/006 370/328 |
| 2010/0322115 | A1 | 12/2010 | Wei et al. |

FOREIGN PATENT DOCUMENTS

| | | |
|---|---|---|
| CN | 101483915 A | 7/2009 |
| CN | 101772030 A | 7/2010 |
| CN | 102404850 A | 4/2012 |

OTHER PUBLICATIONS

International Search Report and Written Opinion issued in PCT/CN2013/080709, mailed Oct. 17, 2013.

CATT et al., "Special Subframe Design for Optimized TDD Type 2", 3GPP Draft; R1-074822, 3rd Generation Partnership Project (3GPP), Mobile Competence Centre; 650, Route Des Lucioles; F-06921 Sophia-Antipolis Cedex; France, vol. RAN WG1, No. Korea; Nov. 6, 2007, Nov. 6, 2007 (Nov. 6, 2007), XP050108283, [retrieved on Nov. 6, 2007].

Dahlman E., et al., "Physical Transmission Resources—Chapter 9" In: "4G LTE/LTE-Advanced for Mobile Broadband", Mar. 29, 2011 (Mar. 29, 2011), Academic Press, XP055248763, pp. 127-141.

Samsung: "Additional Special Subframe Configuration for LTE TDD", 3GPP Draft; R1-121651, 3rd Generation Partnership Project (3GPP), Mobile Competence Centre; 650, Route Des Lucioles; F-06921 Sophia-Antipolis Cedex; France, vol. RAN WG1, No. Jeju, Korea; Mar. 26, 2012-Mar. 30, 2012, Mar. 20, 2012 (Mar. 20, 2012), XP050599914, [retrieved on Mar. 20, 2012].

Supplementary European Search Report—EP13825298—Search Authority—The Hague—May 31, 2016.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

| TD-SCDMA DL/UL configuration | Possible LTE SSF configurations (DwPTS:GP:UpPTS) |
|---|---|
| 2:4 (DSUUUUDD) | k: (14-k-n):n, where k=1, 1≤n≤13-k<br>(1:12:1/1:11:2/1:10:3/1:9:4/1:8:5/1:7:6/1:6:7/1:5:8/1:4:9/1:3:10/1:2:11/1:1:12)<br>Note:The valid LTE UL/DL configuration for coexistence is configuration 1: DSUUD |
| 3:3 (DSUUDDD) | k: (14-k-n):n, where 1≤k≤10, 1≤n≤13-k<br>(10:3:1/10:2:2/10:1:3<br>9:4:1/9:3:2/9:2:3/9:1:4<br>8:5:1/8:4:2/8:3:3/8:2:4/8:1:5<br>7:6:1/7:5:2/7:4:3/7:3:4/7:2:5/7:1:6<br>Plus all configurations for 4:2 below)<br>Note: The valid LTE UL/DL configuration for coexistence is configuration 1: DSUUD |
| 4:2 (DSUUDDDD) | k: (14-k-n):n, where 1≤k≤6, 1≤n≤13-k<br>(6:7:1/6:6:2/6:5:3/6:4:4/6:3:5/6:2:6/6:1:7<br>Plus all configurations for 1:5 below)<br>Note: The valid LTE UL/DL configuration for coexistence is configuration 2: DSUUD |
| 1:5 (DSUUUUUD) | k: (14-k-n):n, where 1≤k≤5, 1≤n≤13-k<br>(5:8:1/5:7:2/5:6:3/5:5:4/5:4:5/5:3:6/5:2:7/5:1:8<br>4:9:1/4:8:2/4:7:3/4:6:4/4:5:5/4:4:6/4:3:7/4:2:8/4:1:9<br>3:10:1/3:9:2/3:8:3/3:7:4/3:6:5/3:5:6/3:4:7/3:3:8/3:2:9/3:1:10<br>2:11:1/2:10:2/2:9:3/2:8:4/2:7:5/2:6:6/2:5:7/2:4:8/2:3:9/2:2:8/2:1:10/2:1:11<br>1:12:1/1:11:2/1:10:3/1:9:4/1:8:5/1:7:6/1:6:7/1:5:8/1:4:9/1:3:10/1:1:11/1:1:12)<br>Note:The valid LTE UL/DL configuration for coexistence is configuration 0: DSUUU |

SUBFRAME CONFIGURATIONS FOR LTE TDD SYSTEMS

CROSS-REFERENCE TO RELATED APPLICATIONS

The present patent application claims priority to International Application No. PCT/CN2012/079623, filed 3 Aug. 2012 in the State Intellectual Property Office of the People's Republic of China, and entitled "Subframe Configurations for LTE TDD Systems," which is assigned to the assignee of the present application and hereby expressly incorporated by reference in its entirety.

BACKGROUND

Field

Certain aspects of the present disclosure generally relate to wireless communications and, more particularly, to transmitting uplink transmissions in special subframes for LTE TDD systems.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

SUMMARY

Certain aspects of the disclosure provide a method for wireless communications. The method generally includes determining a region of uplink transmissions in an uplink pilot timeslot (UpPTS) associated with a first radio access technology (RAT) network, wherein the UpPTS comprises three or more symbols allocated for uplink transmissions, and transmitting in the UpPTS.

Certain aspects of the present disclosure provide an apparatus for wireless communications. The apparatus generally includes means for determining a region of uplink transmissions in an uplink pilot timeslot (UpPTS) associated with a first radio access technology (RAT) network, wherein the UpPTS comprises three or more symbols allocated for uplink transmissions, and means for transmitting in the UpPTS.

Certain aspects of the present disclosure provide an apparatus for wireless communications. The apparatus generally includes at least one processor and a memory coupled to the at least one processor. The at least one processor is generally configured to determine a region of uplink transmissions in an uplink pilot timeslot (UpPTS) associated with a first radio access technology (RAT) network, wherein the UpPTS comprises three or more symbols allocated for uplink transmissions, and transmit in the UpPTS.

Certain aspects of the present disclosure provide a computer-program product for wireless communications. The computer-program product generally includes a computer-readable medium having code for determining a region of uplink transmissions in an uplink pilot timeslot (UpPTS) associated with a first radio access technology (RAT) network, wherein the UpPTS comprises three or more symbols allocated for uplink transmissions, and transmitting in the UpPTS.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
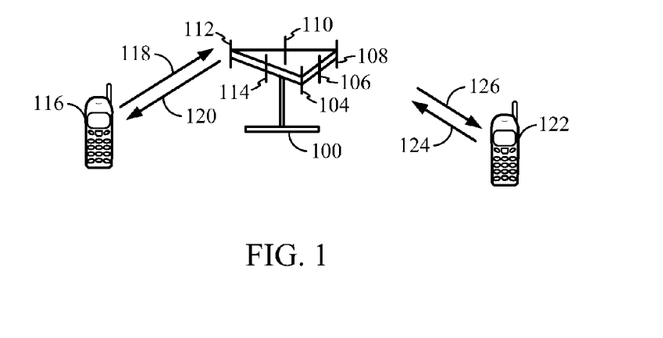
FIG. 1 illustrates an example multiple access wireless communication system in accordance with certain aspects of the present disclosure.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
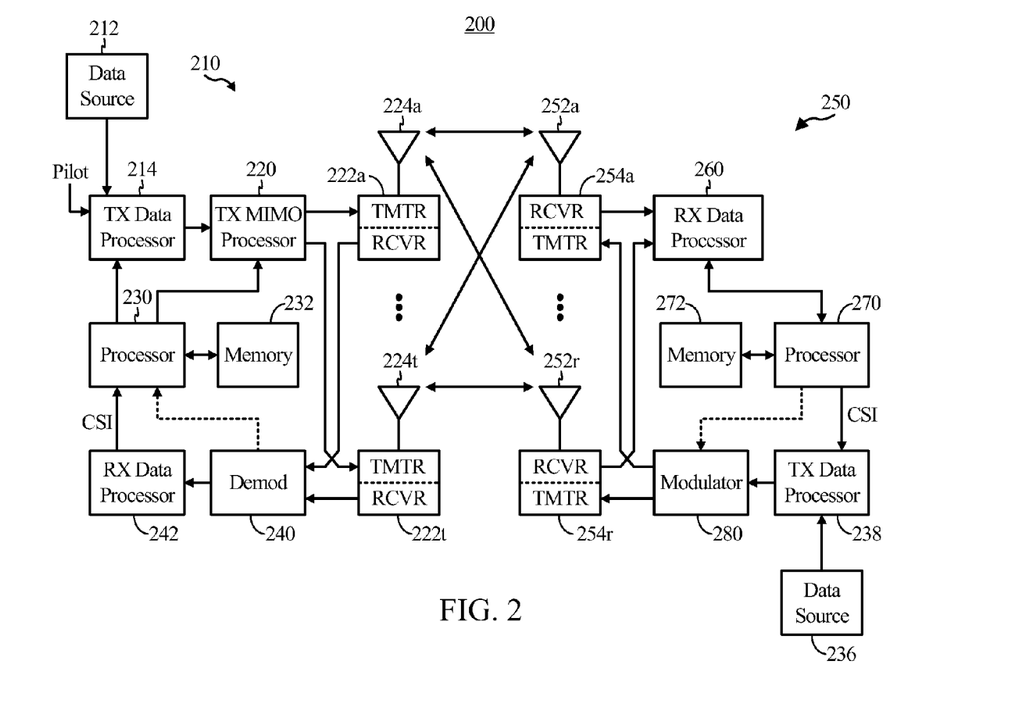
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency division multiplexing (OFDM) techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
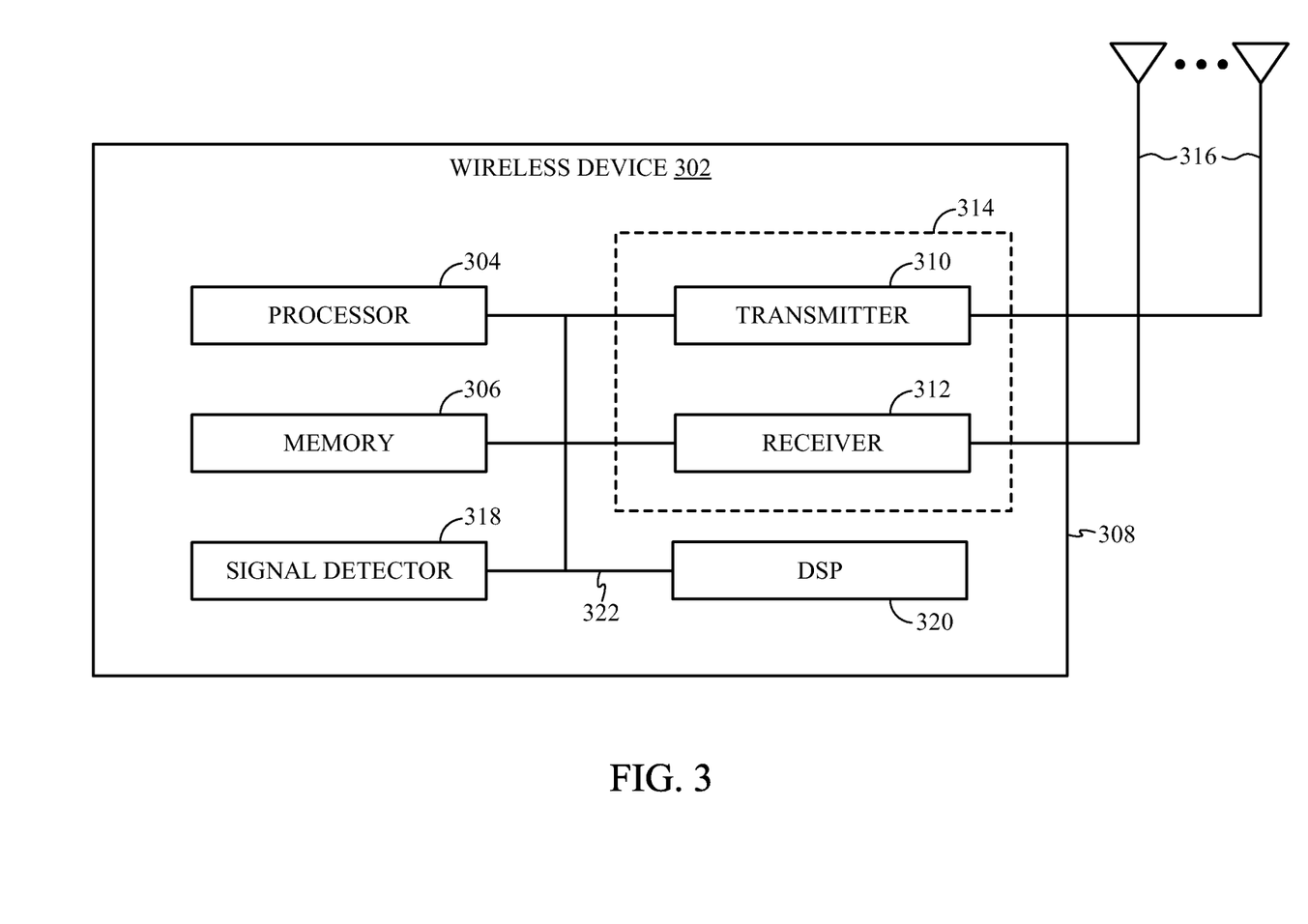
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
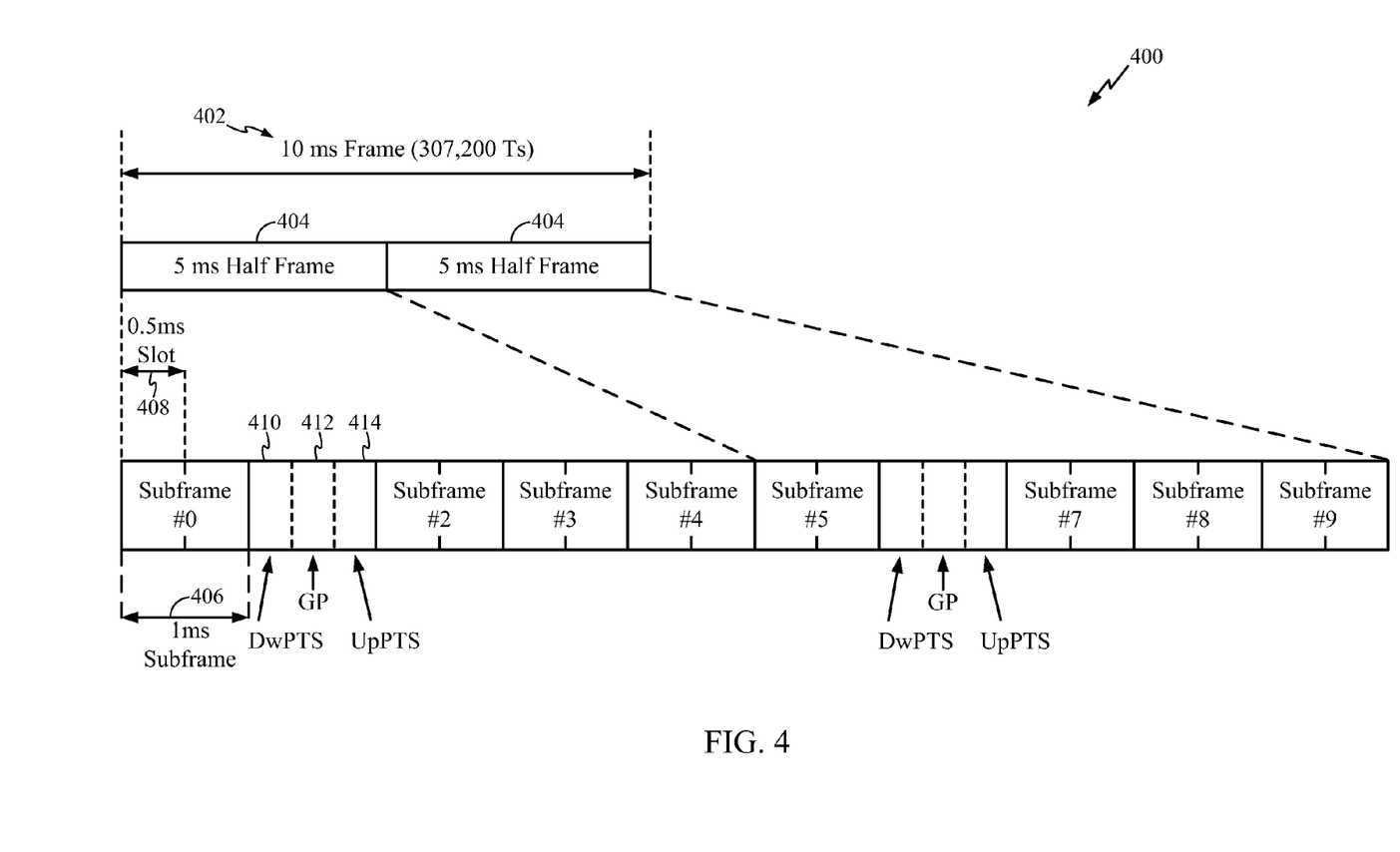
FIG. 4 is a block diagram conceptually illustrating an example of a frame structure in a telecommunications system, in accordance with certain aspects of the present disclosure.

FIG. 4 shows a frame structure 400 for a Time Division Duplex Long Term Evolution (LTE TDD) carrier. The LTE TDD carrier, as illustrated, has a frame 402 that is 10 ms in length. The frame 402 has two 5 ms half frames 404, and each of the half frames 404 includes five 1 ms subframes 406. Each subframe 406 may be a downlink subframe (D), an uplink subframe (U), or a special subframe (SSF). Downlink subframes and uplink subframes may be divided into two 0.5 ms slots 408.

Special subframes may be divided into a downlink pilot timeslot (DwPTS) 410, a guard period (GP) 412, and an uplink pilot time slot (UpPTS) 414, where the length of each field may vary, with the total length of 1 ms. Up to Rel-10, LTE TDD specifies at least nine SSF configurations, which may be found in 3GPP TS36.211, section 4.2, table 4.2-1. Traditionally, UpPTS may have only one or two symbols in all existing configurations, which may be used for short random access channel (RACH) transmissions and sounding reference signal (SRS) transmissions.

Figure 5:
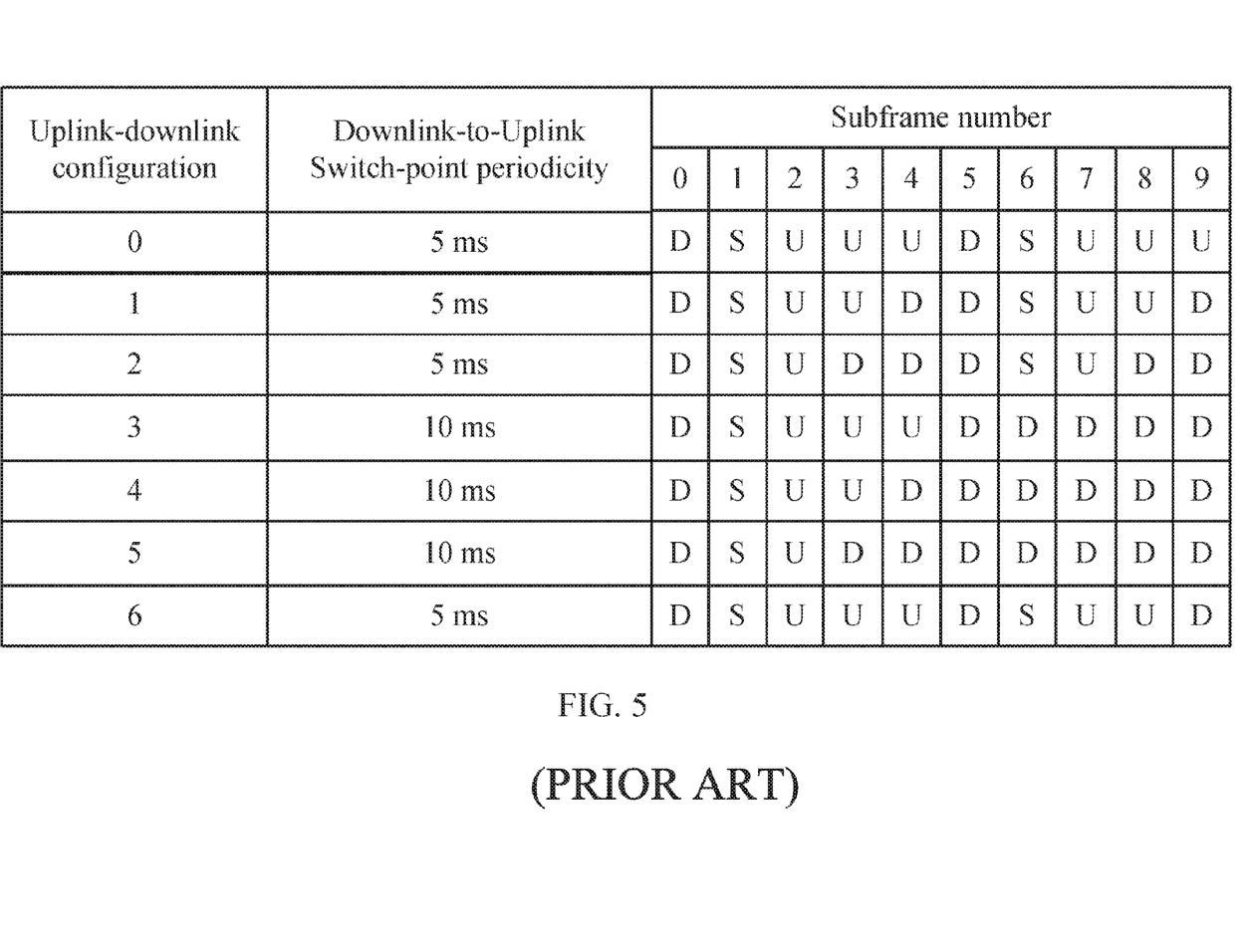
FIG. 5 illustrates an example list of downlink/uplink (DL/UL) configurations in a frame in the LTE TDD standard, in accordance with certain aspects of the present disclosure.

FIG. 5 illustrates an example list of the downlink/uplink configurations in a LTE TDD frame 402 according to the LTE standard. In this table D, U, and S indicate Downlink, Uplink and Special subframes 406, respectively. The special subframe S may consist of DwPTS 410, GP 412, and UpPTS 414 fields. As illustrated, several DL/UL configurations for 5 ms switch point periodicity and 10 ms switch point periodicity may be chosen for a LTE TDD frame 402. The configurations 0, 1, and 2 have two identical 5 ms halfframes 404 within a 10 ms LTE TDD frame 402. In the case of 5 ms switch point periodicity, a special frame may exist in both half-frames 404. However, in the case of 10 ms switch point periodicity, a special subframe may exist in the first half-frame only. Subframes 0 and 5 and DwPTS may be reserved for DL transmission. In addition, UpPTS and the subframe immediately following a special subframe may be reserved for UL transmission.

Subframe Configurations for LTE TDD Systems

Figure 6:
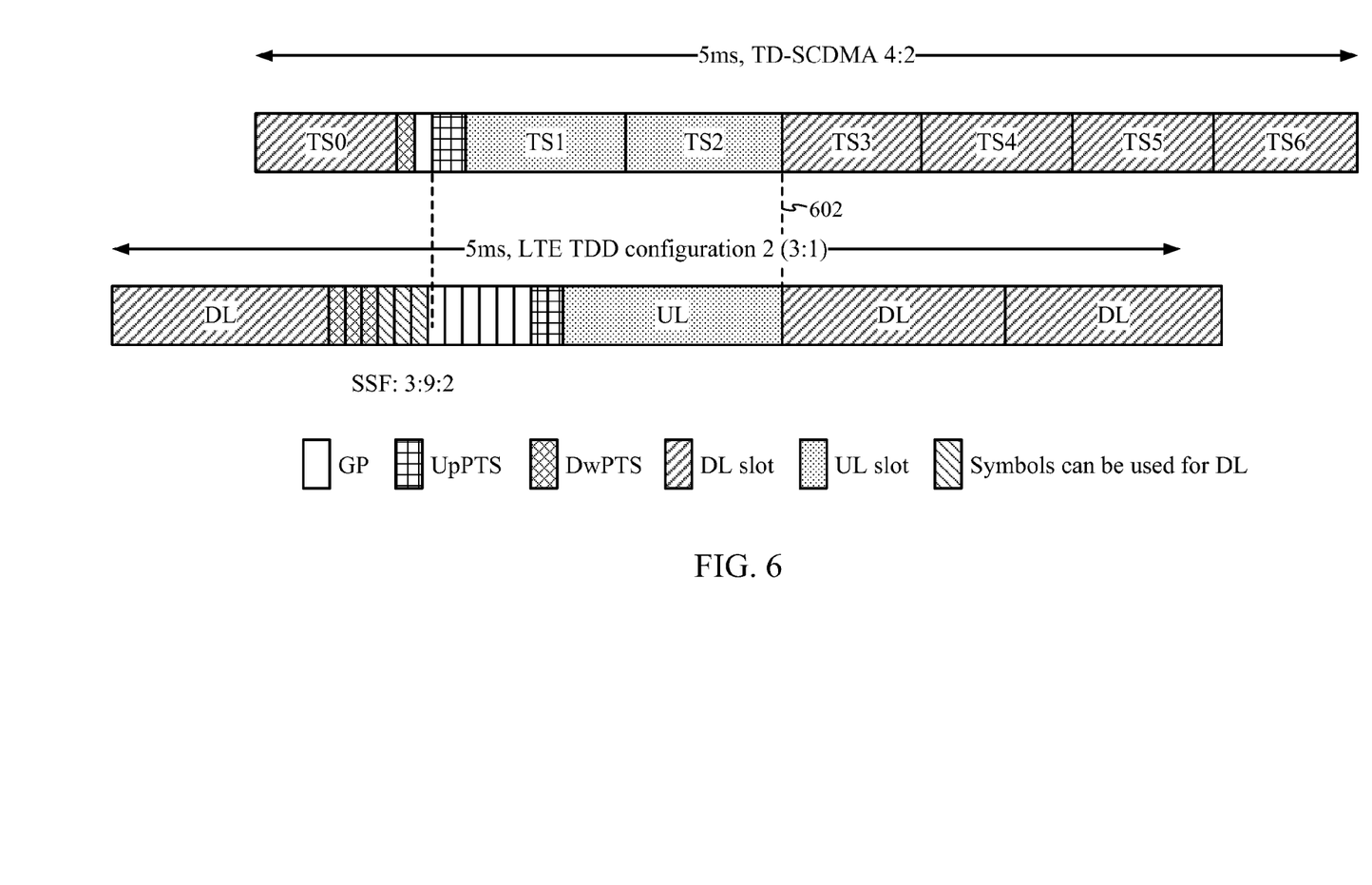
FIG. 6 illustrates the coexistence of different TDD systems.

FIG. 6 illustrates the coexistence of different TDD systems (e.g., TD-SCDMA and LTE TDD). The TDD systems may coexist by aligning the uplink resources, as indicated at 602. The choice of SSF configurations may take into consideration coexistence with other TDD systems (e.g., TD-SCDMA). A current DL/UL configuration of commercial TD-SCDMA networks is 4:2, as illustrated in FIG. 6. A valid LTE configuration to coexist with TD-SCDMA may be configuration 2 (i.e., 3:1, DSUDD). Among the existing SSF configurations, 3:9:2 and 3:10:1 (i.e., DwPTS:GP:UpPTS) may be adopted.

For the above-mentioned coexistence scenario, the GP field may have a redundancy, and at least 3 more symbols may be added for DL, as illustrated in FIG. 6. Furthermore, the GP may be used for LTE DL to UL interference migration, while a GP length of 9 or 10 symbols may provide support for a maximum cell radius of approximately 96 km/107 km, which may exceed requirements in most scenarios. In a commercial deployment, such a large cell may not be adopted. As a result, the DwPTS field may be extended to the GP area. For example, a new SSF configuration of 6:6:2 may be used for coexistence with DL/UL 4:2 TD-SCDMA networks. With this SSF configuration, six symbols may be used for DwPTS, which may bring approximately a 10% DL capacity gain. Moreover, a GP length of 6 symbols may be sufficient to cope with DL to UL interference migration, providing a maximum cell radius of approximately 60 km. Thus, a redundant GP area may be adopted for transmission of either data or signaling.

UL channel sounding is important for an eNB acquiring UL channel information, which may enable frequency selective scheduling and link adaptation. DL beamforming based on channel reciprocity may also need UL sounding reference signal (SRS) transmissions in LTE TDD. In LTE, SRS transmission may use an interleaved frequency division multiple access (FDMA) structure, resulting in a comb-like structure. UEs may then be configured to use either the even or the odd comb-offset. Multiple UEs may be configured to transmit SRS using the same resource blocks (RBs) and the same comb-offset, and there may be up to eight different cyclic shifts of the SRS sequence to achieve orthogonal separation, resulting in sixteen SRS transmission opportunities on the same SRS resource.

There may be additional restrictions where SRS transmission needs to be avoided, for example, if the SRS transmission coincides with other UL transmissions (e.g., if SRS is coincided with CQI (Channel Quality Information) in the same subframe, SRS should not be transmitted). These restrictions may result in limited SRS transmission opportunities, particularly in a multiuser system. Limited SRS transmission may have a negative impact on DL beamforming performance, which may be sensitive to channel state information accuracy.

SRS may also be configured in a normal subframe. However, configuring SRS in a normal subframe may decrease UL resources available for other uplink transmissions, such as physical uplink shared channel (PUSCH) and physical uplink control channel (PUCCH). Therefore, SRS transmission may be configured in the UpPTS in order to save valuable UL access resources.

As an example for SRS transmissions, taking a 5 ms SRS periodicity, two SSFs/10 ms, and requiring full channel information (e.g., either via wideband or multiple subband sounding), when SRS resources are configured in UpPTS (e.g., two symbols at most per current standard), only 32 users may be scheduled to transmit SRS and, thus, may only serve 32 users with transmission mode (TM) 7 and TM 8 without SRS switching. For TM 8, SRS switching may be adopted if an eNB needs to know channels toward a UE's two antennas, resulting in only sixteen supported users. Even if SRS transmission is also configured in normal subframes, taking DL/UL configuration 2 as an example, up to 48/24 users without/with SRS switching may be supported, respectively. Therefore, there are insufficient SRS resources, particularly when the UpPTS has only two symbols.

In Rel-10 LTE TDD and later releases, higher order DL MIMO based on beamforming is defined. To achieve better performance from enjoying channel reciprocity, more SRS transmissions are preferred. Besides, to better support higher-order UL MIMO (e.g., defined in Rel-10), SRS transmissions from different UL antennas may also be required. Thus, it is expected that Rel-8/9 SRS resources may be limited for Rel-10 and beyond. Therefore, aspects of the present disclosure provide techniques for mitigating the SSF GP redundancy and increasing resources for UL transmission.

Aspects of the present disclosure provide SSF configurations which have more UpPTS symbols to address the issues described above. For certain aspects, the UpPTS area may be extended to the current GP area, thus having more UpPTS symbols for UL transmission. Typically, the SSF configuration may be determined when a network is deployed. Thereafter, which UpPTS symbols are used for a certain UE may be scheduled by the network or the UE. The UpPTS symbols may be used for SRS (or short RACH) transmissions, while different SSF configurations may be used to meet different coexistence requirements. The UpPTS symbols may also be used for other purposes, such as peer-to-peer communication and various other UL data transmissions.

Figure 7:
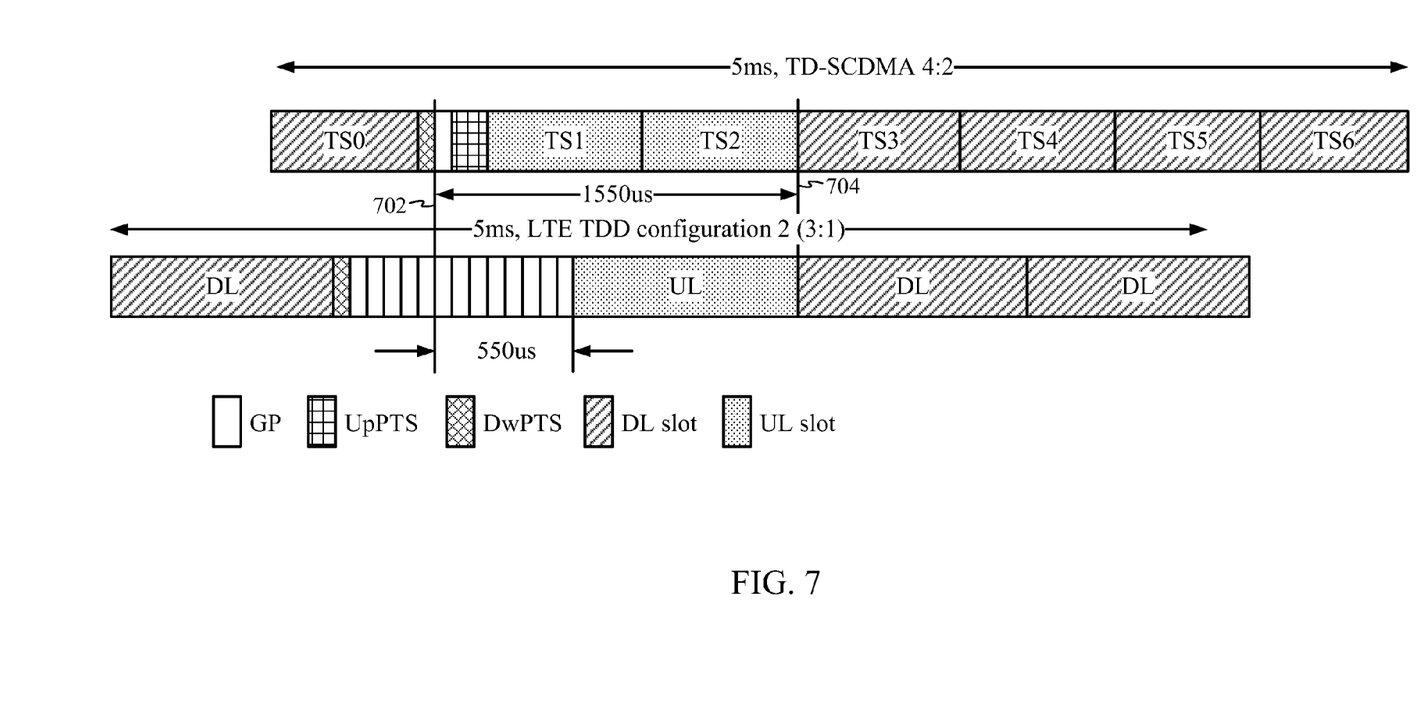
FIG. 7 illustrates the coexistence of different TDD systems, with additional UpPTS symbols, in accordance with certain aspects of the present disclosure.

FIG. 7 illustrates the coexistence of different TDD systems (e.g., TD-SCDMA of DL/UL 4:2 and LTE TDD of DL/UL 3:1), with additional UpPTS symbols, in accordance with certain aspects of the present disclosure. Table 1 illustrates the length of each field of TD-SCDMA:

TABLE 1

Length of each field in TD-SCDMA frame

| | TS0 | Special | | | TS1 | TS2 | TS3 | TS4 | TS5 | TS6 |
|---|---|---|---|---|---|---|---|---|---|---|
| Timeslot | DL | DwPTS | GP | UpPTS | UL | UL | DL | DL | DL | DL |
| Length(us) | 675 | 75 | 75 | 125 | 675 | 675 | 675 | 675 | 675 | 675 |

A sum of the total uplink resources (e.g., TS1, TS2, and UpPTS) and the guard period of TD-SCDMA is 1,550 μs (675×2+125+75). As mentioned above, the TDD systems may coexist by aligning the uplink resources. Therefore, considering that LTE TDD of DL/UL 3:1 has one uplink subframe (e.g., 1,000 μs), the combined minimum length of the GP and the UpPTS of LTE TDD may be 550 μs (1,550 μs−1,000 μs). As a result, the uplink resources of the TDD systems may be aligned at 702 and 704. With each symbol having a length of approximately 71.35 μs, the GP and the UpPTS may be distributed over 8 symbols (e.g., 550 μs/71.35≈8 symbols), leaving 6 symbols for DwPTS. Distributing the 8 symbols between the GP and the UpPTS may result in the following configurations (DwPTS:GP:UpPTS, 6:(8−n):n, where n is the number of UpPTS symbols):

6:7:1,
6:6:2,
6:5:3,
6:4:4,
6:3:5,
6:2:6, and
6:1:7.

Compared to existing SSF configurations (e.g., up to two symbols for UpPTS), five of the seven configurations have more UpPTS symbols, and these configurations also have more DwPTS symbols (thus more efficient from the DL perspective). For the last configuration (6:1:7), a GP of 1 symbol length may cope with DL to UL interference with a cell radius of approximately 10 km, which may meet a typical LTE TDD deployment scenario. Thus, the GP of the new configurations may be sufficient.

Figure 8:
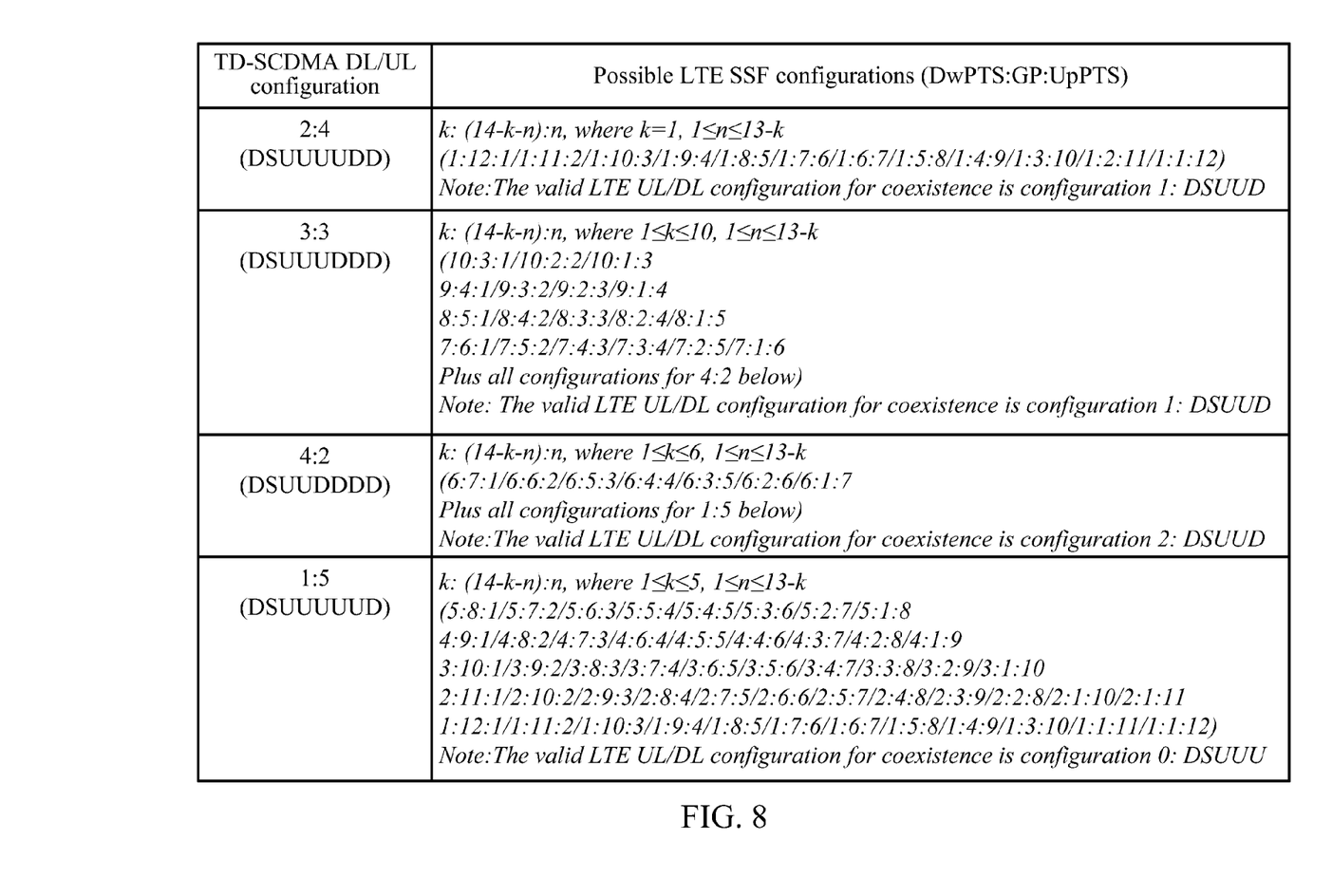
FIG. 8 illustrates LTE TDD special subframe (SSF) configurations for coexistence with time division synchronous code division multiple access (TD-SCDMA) networks of various DL/UL configurations, in accordance with certain aspects of the present disclosure.

FIG. 8 illustrates LTE TDD SSF configurations for coexistence with TD-SCDMA networks of other DL/UL configurations, in accordance with certain aspects of the present disclosure. With respect to TD-SCDMA of DL/UL 3:3, LTE TDD SSF configurations with more than four UpPTS symbols may not be valid for coexistence with a TD-SCDMA system because the DwPTS of the TD-SCDMA system may interfere with the UpPTS of the LTE TDD system. With respect to TD-SCDMA of DL/UL 4:2, LTE TDD SSF configurations with more than seven UpPTS symbols may not be valid for coexistence with a TD-SCDMA system. With respect to TD-SCDMA of DL/UL 1:5, LTE TDD SSF configurations with more than eight UpPTS symbols may not be valid for coexistence with a TD-SCDMA system. Although FIG. 8 illustrates LTE TDD SSF configurations for coexistence with TD-SCDMA networks, the SSF configurations may be used for a standalone LTE TDD deployment (e.g., in the scenario where there is no coexistence requirement with TD-SCDMA systems).

As described above, UpPTS symbols may be used for SRS transmission (or short RACH) or other UL transmissions (e.g., PUSCH, peer-to-peer communications). The configuration used for actual deployments may depend on various factors, such as the cell coverage/radius (GP length), required SRS capacity, and the required RACH capacity.

Figure 9A:
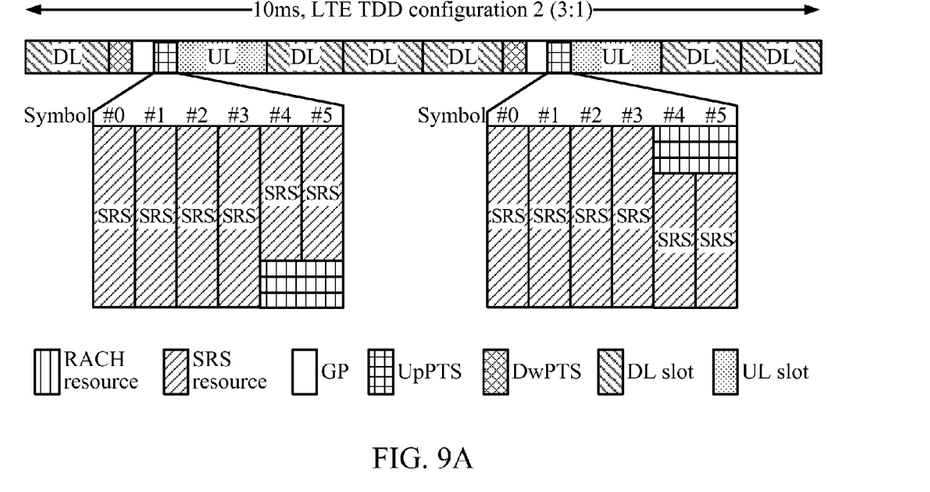
FIGS. 9A-B illustrate the transmission of sounding reference signals (SRS) and random access channel (RACH) by utilizing additional uplink pilot timeslot (UpPTS) symbols in a SSF configuration of 6:2:6, in accordance with certain aspects of the present disclosure.
Figure 9B:
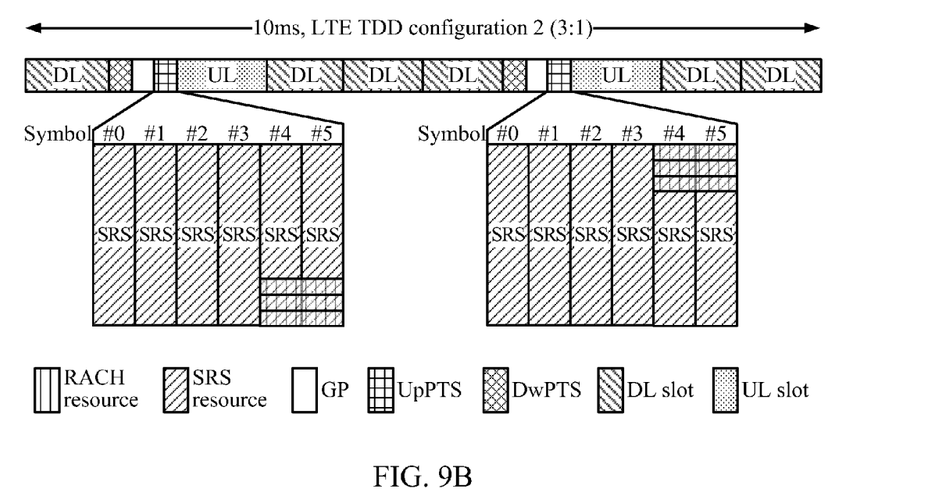

FIGS. 9A-B illustrate the transmission of SRS and RACH by utilizing additional UpPTS symbols in a SSF configuration of 6:2:6, in accordance with certain aspects of the present disclosure. The SSF configuration of 6:2:6 may be used for coexistence with 4:2 TD-SCDMA, as illustrated in FIG. 8. FIGS. 9A-B illustrate various ways for configuring SRS and RACH in UpPTS.

Referring to FIG. 9A, SRS resources may not be configured to overlap with RACH resources (indicated by the opaqueness of the RACH resources in the last two UpPTS symbols). In this way, SRS may be configured in accordance with a subband. For example, for a 20 MHz bandwidth, SRS may be configured to use 48 resource blocks (RBs) in the last two UpPTS symbols (e.g., where RACH is configured) and to use 96 RBs in the other UpPTS symbols. For certain aspects, multiple subband SRS instances may be used to sound full channel, if required.

Referring to FIG. 9B, SRS resources may be configured to overlap with RACH resources (indicated by the transparency of the RACH resources in the last two UpPTS symbols). In this way, SRS resources in all the UpPTS symbols may be full band. For example, for a 20 MHz bandwidth, SRS may be configured to use 96 RBs in all the UpPTS symbols.

Compared to the two symbols that are traditionally reserved for UpPTS symbols, FIGS. 9A-B illustrate four additional UpPTS symbols for SRS. If using the method illustrated in FIG. 9B, or when RACH is not configured in UpPTS, and taking 5 ms SRS periodicity, two SSFs/10 ms, requiring full channel information, and configuring SRS only in UpPTS as an example, up to 96 users may be served using TM 7 or TM 8 without SRS switching. If SRS switching is required, 48 users may be supported. As a result, about a 200% gain may be achieved (e.g., 96 versus 32/48 versus 16 users without/with SRS switching, respectively). If SRS is also configured in normal subframes, with the same assumption (e.g., 5 ms SRS periodicity, UL/DL configuration 2, and full band sounding), 112/56 users may be supported (e.g., 133% gain; 112 versus 48/56 versus 24 users without/with SRS switching, respectively). SSF configurations with more UpPTS symbols may provide an even greater gain. For example, if twelve symbols are available for UpPTS, the gain may be 500% when SRS is only configured in UpPTS, and the gain may be 333% when SRS is configured in both UpPTS and normal subframes.

With UpPTS of two symbols as baseline, Table 2 provides a summary of the approximate gains (regarding supported users to transmit SRS) of having more UpPTS symbols under the same assumption as above (e.g., 5 ms SRS periodicity, 2 SSFs/10 ms, full channel information, and LTE UL/DL configuration 2:

TABLE 2

Achieved gains of having more UpPTS symbols

| UpPTS symbols | SRS in UpPTS only | SRS in UpPTS and Normal SF |
|---|---|---|
| 2(3GPP R8) | 100% | 100% |
| 3 | +50% | +33.3% |
| 4 | +100% | +66.7% |
| 5 | +150% | +100% |
| 6 | +200% | +133.3% |
| 7 | +250% | +166.7% |
| 8 | +300% | +200% |
| 9 | +350% | +233.3% |
| 10 | +400% | +266.7% |
| 11 | +450% | +300% |
| 12 | +500% | +333.3% |

Traditionally, RACH resources may be configured in the last two symbols of the UpPTS. Therefore, in an effort to maintain backward compatibility, RACH resources may not be configured in the other UpPTS symbols. Thus, if SRS is configured in the other UpPTS symbols, the bandwidth may be equal to the total UL bandwidth.

For periodic SRS transmissions, legacy UEs may not be able to be configured to use the additional UpPTS symbols. If frequency hopping of multiple subband SRSs is allowed for a non-legacy UE between the additional UpPTS symbols and the legacy symbols (e.g., the last two UpPTS symbols), collisions may occur. For certain aspects, frequency hopping may occur either between the additional UpPTS symbols or between the legacy symbols, but not both.

For aperiodic SRS transmissions, a specific UE may be triggered to transmit SRS only in one of the UpPTS symbols, at least for full-band SRS. If frequency hopping is enabled for aperiodic SRS transmission, transmission may be allowed over multiple symbols in UpPTS, cycling through multiple portions of the bandwidth. For certain aspects, a UE may indicate which symbol to carry aperiodic SRS transmissions in UpPTS, and different UEs may be indicated with different symbols for load balance. As an example, the UE may provide such indications by radio resource control (RRC) configuration or (enhanced) physical downlink control channel ((e)PDCCH).

Figure 10:
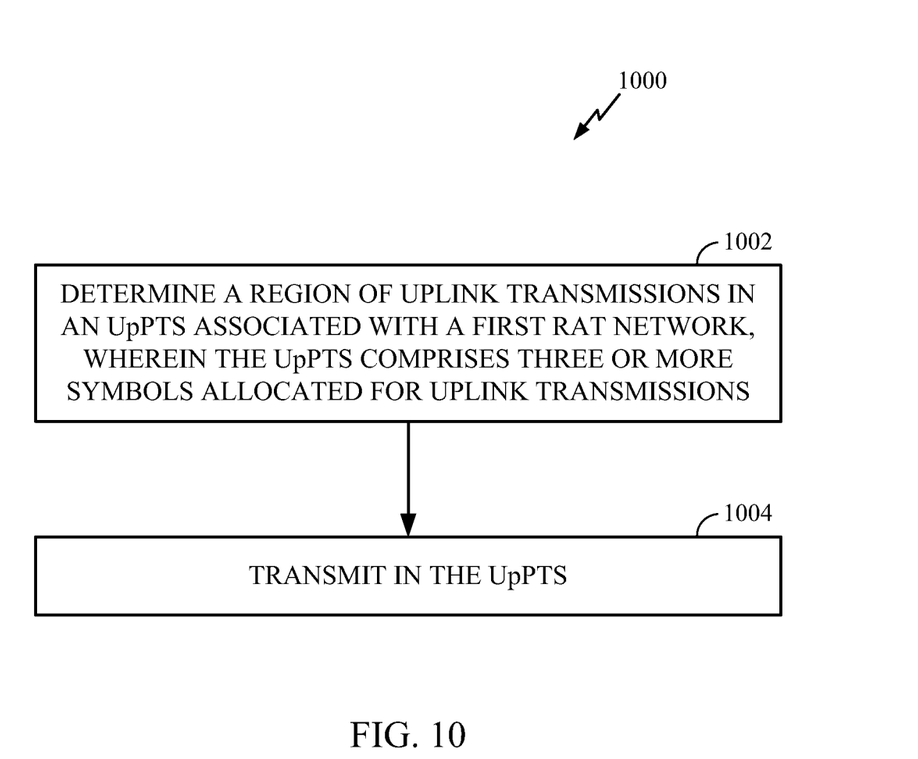
FIG. 10 is a flow diagram of example operations for transmitting uplink transmissions in additional UpPTS symbols, in accordance with certain aspects of the present disclosure.

FIG. 10 is a flow diagram of example operations 1000 for transmitting uplink transmissions in additional UpPTS symbols, in accordance with certain aspects of the present disclosure. The operations 1000 may be performed, for example, from the perspective of a UE operating in a first radio access technology (RAT) (e.g., LTE TDD). At 1002, the UE may determine a region of uplink transmissions in an UpPTS associated with a first radio access technology (RAT) network, wherein the UpPTS generally includes three or more symbols allocated for uplink transmissions. As mentioned above, the SSF configuration (DwPTS:GP:UpPTS) for a particular network may be determined when the network is deployed. Thereafter, which UpPTS symbols are used for a certain UE may be scheduled by the network or the UE. For certain aspects, the UpPTS area may be extended to the current GP area, thus having the additional UpPTS symbols for UL transmission.

Examples of the uplink transmissions generally include SRS transmissions, RACH transmissions, PUSCH transmissions, or transmissions involving peer-to-peer (P2P) communication. For certain aspects, the SRS transmissions may overlap with the RACH transmissions in a last two symbols of the three or more symbols allocated for uplink transmissions. At 1004, the UE may transmit in the UpPTS.

For certain aspects, the first RAT network may coexist with a second RAT network (e.g., TD-SCDMA) by aligning uplink transmissions between the first and second RAT networks. A portion of the symbols allocated for uplink transmissions may overlap with at least a GP and an UpPTS associated with the second RAT network. For certain aspects, a number of symbols allocated for a GP and the UpPTS associated with the first RAT may be determined by determining a total time duration of the GP and the UpPTS associated with the second RAT network, and uplink timeslots that are associated with the second RAT network, and then determining a difference between the total time duration and a time duration of uplink subframes associated with the first RAT network.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a user equipment (UE), comprising:
   determining, by the UE, a region of uplink transmissions in an uplink pilot timeslot (UpPTS) associated with a first radio access technology (RAT) network, wherein the UpPTS comprises three or more symbols allocated for uplink transmissions;
   aligning uplink transmissions between the first RAT network and a second RAT network so that the first RAT network coexists with the second RAT network, wherein a number of the three or more UpPTS symbols is based on a configuration of the second RAT, wherein a portion of the symbols for uplink transmissions overlaps with at least a guard period (GP) and an UpPTS associated with the second RAT network, and wherein a number of symbols allocated for a GP and the UpPTS associated with the first RAT network is determined by:
      determining a total time duration of the GP associated with the second RAT network, the UpPTS associated with the second RAT network, and uplink timeslots associated with the second RAT network; and
      determining a difference between the total time duration and a time duration of uplink subframes associated with the first RAT network; and
   transmitting in the UpPTS.

2. The method of claim 1, wherein the uplink transmissions comprise at least sounding reference signal (SRS) transmissions, random access channel (RACH) transmissions, physical uplink shared channel (PUSCH) transmissions, or transmissions involving peer-to-peer (P2P) communication.

3. The method of claim 2, wherein the SRS transmissions overlap with the RACH transmissions in a last two symbols of the three or more symbols allocated for uplink transmissions.

4. The method of claim 1, wherein at least one symbol of the number of symbols allocated for the GP and the UpPTS associated with the first RAT network is allocated for the GP.

5. The method of claim 1, wherein the second RAT network comprises time division synchronous code division multiple access (TD-SCDMA).

6. The method of claim 4, wherein the first RAT network comprises Long Term Evolution (LTE) time division duplex (TDD).

7. The method of claim 6, wherein for a TD-SCDMA downlink/uplink configuration of 2:4, LTE TDD special subframe (SSF) configurations comprise k:(14−k−n):n, wherein k=1, and 1≤n≤13−k, and wherein k indicates a number orthogonal frequency division multiplexing (OFDM) symbols of a downlink pilot timeslot (DwPTS) and n indicates a number OFDM symbols of a UpPTS.

8. The method of claim 6, wherein for a TD-SCDMA downlink/uplink configuration of 3:3, LTE TDD special subframe (SSF) configurations comprise k:(14−k−n):n, wherein 1≤k≤10, and 1≤n≤13−k, and wherein k indicates a number orthogonal frequency division multiplexing (OFDM) symbols of a downlink pilot timeslot (DwPTS) and n indicates a number OFDM symbols of a UpPTS.

9. The method of claim 6, wherein for a TD-SCDMA downlink/uplink configuration of 4:2, LTE TDD special subframe (SSF) configurations comprise k:(14−k−n):n, wherein 1≤k≤6, 1≤n≤13−k, and wherein k indicates a number orthogonal frequency division multiplexing (OFDM) symbols of a downlink pilot timeslot (DwPTS) and n indicates a number OFDM symbols of a UpPTS.

10. The method of claim 6, wherein for a TD-SCDMA downlink/uplink configuration of 1:5, LTE TDD special subframe (SSF) configurations comprise k:(14−k−n):n, wherein 1≤k≤5, 1≤n≤13−k, and wherein k indicates a number orthogonal frequency division multiplexing (OFDM) symbols of a downlink pilot timeslot (DwPTS) and n indicates a number OFDM symbols of a UpPTS.

11. An apparatus for wireless communications, comprising:
    means for determining a region of uplink transmissions in an uplink pilot timeslot (UpPTS) associated with a first radio access technology (RAT) network, wherein the UpPTS comprises three or more symbols allocated for uplink transmissions;
    means for aligning uplink transmissions between the first RAT network and a second RAT network so that the first RAT network coexists with the second RAT network, wherein a number of the three or more UpPTS symbols is based on a configuration of the second RAT, wherein a portion of the symbols for uplink transmissions overlaps with at least a guard period (GP) and an UpPTS associated with the second RAT network, and wherein a number of symbols allocated for a GP and the UpPTS associated with the first RAT network is determined by:
        determining a total time duration of the GP associated with the second RAT network, the UpPTS associated with the second RAT network, and uplink timeslots associated with the second RAT network; and
        determining a difference between the total time duration and a time duration of uplink subframes associated with the first RAT network; and
    means for transmitting in the UpPTS.

12. The apparatus of claim 11, wherein the uplink transmissions comprise at least sounding reference signal (SRS) transmissions, random access channel (RACH) transmissions, physical uplink shared channel (PUSCH) transmissions, or transmissions involving peer-to-peer (P2P) communication.

13. The apparatus of claim 12, wherein the SRS transmissions overlap with the RACH transmissions in a last two symbols of the three or more symbols allocated for uplink transmissions.

14. The apparatus of claim 11, wherein at least one symbol of the number of symbols allocated for the GP and the UpPTS associated with the first RAT network is allocated for the GP.

15. The apparatus of claim 11, wherein the second RAT network comprises time division synchronous code division multiple access (TD-SCDMA).

16. The apparatus of claim 15, wherein the first RAT network comprises Long Term Evolution (LTE) time division duplex (TDD).

17. The apparatus of claim 16, wherein for a TD-SCDMA downlink/uplink configuration of 2:4, LTE TDD special subframe (SSF) configurations comprise k:(14−k−n):n, wherein k=1, and 1≤n≤13−k, and wherein k indicates a number orthogonal frequency division multiplexing (OFDM) symbols of a downlink pilot timeslot (DwPTS) and n indicates a number OFDM symbols of a UpPTS.

18. The apparatus of claim 16, wherein for a TD-SCDMA downlink/uplink configuration of 3:3, LTE TDD special subframe (SSF) configurations comprise k:(14−k−n):n, wherein 1≤k≤10, and 1≤n≤13−k, and wherein k indicates a number orthogonal frequency division multiplexing (OFDM) symbols of a downlink pilot timeslot (DwPTS) and n indicates a number OFDM symbols of a UpPTS.

19. The apparatus of claim 16, wherein for a TD-SCDMA downlink/uplink configuration of 4:2, LTE TDD special subframe (SSF) configurations comprise k:(14−k−n):n, wherein 1≤k≤6, 1≤n≤13−k, and wherein k indicates a number orthogonal frequency division multiplexing (OFDM) symbols of a downlink pilot timeslot (DwPTS) and n indicates a number OFDM symbols of a UpPTS.

20. The apparatus of claim 16, wherein for a TD-SCDMA downlink/uplink configuration of 1:5, LTE TDD special subframe (SSF) configurations comprise k:(14−k−n):n, wherein 1≤k≤5, 1≤n≤13−k, and wherein k indicates a number orthogonal frequency division multiplexing (OFDM) symbols of a downlink pilot timeslot (DwPTS) and n indicates a number OFDM symbols of a UpPTS.

21. An apparatus for wireless communications, comprising:
    at least one processor configured to:
        determine a region of uplink transmissions in an uplink pilot timeslot (UpPTS) associated with a first radio access technology (RAT) network, wherein the UpPTS comprises three or more symbols allocated for uplink transmissions;
        align uplink transmissions between the first RAT network and a second RAT network so that the first RAT network coexists with the second RAT network, wherein a number of the three or more UpPTS symbols is based on a configuration of the second RAT, wherein a portion of the symbols for uplink transmissions overlaps with at least a guard period (GP) and an UpPTS associated with the second RAT network, and wherein the at least one processor is configured to determine a number of symbols allocated for a GP and the UpPTS associated with the first RAT network by:
            determining a total time duration of the GP associated with the second RAT network, the UpPTS associated with the second RAT network, and uplink timeslots associated with the second RAT network; and
            determining a difference between the total time duration and a time duration of uplink subframes associated with the first RAT network; and
        transmit in the UpPTS; and
    a memory coupled to the at least one processor.

22. The apparatus of claim 21, wherein the uplink transmissions comprise at least sounding reference signal (SRS) transmissions, random access channel (RACH) transmissions, physical uplink shared channel (PUSCH) transmissions, or transmissions involving peer-to-peer (P2P) communication.

23. The apparatus of claim 22, wherein the at least one processor is configured to transmit the SRS transmissions overlapping with the RACH transmissions in a last two symbols of the three or more symbols allocated for uplink transmissions.

24. The apparatus of claim 21, wherein at least one symbol of the number of symbols allocated for the GP and the UpPTS associated with the first RAT network is allocated for the GP.

25. The apparatus of claim 21, wherein the second RAT network comprises time division synchronous code division multiple access (TD-SCDMA).

26. The apparatus of claim 25, wherein the first RAT network comprises Long Term Evolution (LTE) time division duplex (TDD).

27. The apparatus of claim 26, wherein for a TD-SCDMA downlink/uplink configuration of 2:4, LTE TDD special subframe (SSF) configurations comprise k:(14−k−n):n, wherein k=1, and 1≤n≤13−k, and wherein k indicates a number orthogonal frequency division multiplexing (OFDM) symbols of a downlink pilot timeslot (DwPTS) and n indicates a number OFDM symbols of a UpPTS.

28. The apparatus of claim 26, wherein for a TD-SCDMA downlink/uplink configuration of 3:3, LTE TDD special subframe (SSF) configurations comprise k:(14−k−n):n, wherein 1≤k≤10, and 1≤n≤13−k, and wherein k indicates a number orthogonal frequency division multiplexing (OFDM) symbols of a downlink pilot timeslot (DwPTS) and n indicates a number OFDM symbols of a UpPTS.

29. The apparatus of claim 26, wherein for a TD-SCDMA downlink/uplink configuration of 4:2, LTE TDD special subframe (SSF) configurations comprise k:(14−k−n):n, wherein 1≤k≤6, 1≤n≤13−k, and wherein k indicates a number orthogonal frequency division multiplexing (OFDM) symbols of a downlink pilot timeslot (DwPTS) and n indicates a number OFDM symbols of a UpPTS.

30. The apparatus of claim 26, wherein for a TD-SCDMA downlink/uplink configuration of 1:5, LTE TDD special subframe (SSF) configurations comprise k:(14−k−n):n, wherein 1≤k≤5, 1≤n≤13−k, and wherein k indicates a number orthogonal frequency division multiplexing (OFDM) symbols of a downlink pilot timeslot (DwPTS) and n indicates a number OFDM symbols of a UpPTS.

31. A non-transitory computer-readable medium having computer executable code stored thereon, comprising:
    code for determining a region of uplink transmissions in an uplink pilot timeslot (UpPTS) associated with a first radio access technology (RAT) network, wherein the UpPTS comprises three or more symbols allocated for uplink transmissions;
    code for aligning uplink transmissions between the first RAT network and a second RAT network so that the first RAT network coexists with the second RAT network, wherein a number of the three or more UpPTS symbols is based on a configuration of the second RAT, wherein a portion of the symbols for uplink transmissions overlaps with at least a guard period (GP) and an UpPTS associated with the second RAT network, and wherein a number of symbols allocated for a GP and the UpPTS associated with the first RAT network is determined by:
        determining a total time duration of the GP associated with the second RAT network, the UpPTS associated with the second RAT network, and uplink timeslots associated with the second RAT network; and
        determining a difference between the total time duration and a time duration of uplink subframes associated with the first RAT network; and
    code for transmitting in the UpPTS.

32. The non-transitory computer-readable medium of claim 31, wherein the uplink transmissions comprise at least sounding reference signal (SRS) transmissions, random access channel (RACH) transmissions, physical uplink shared channel (PUSCH) transmissions, or transmissions involving peer-to-peer (P2P) communication.

33. The non-transitory computer-readable medium of claim 32, wherein the SRS transmissions overlap with the RACH transmissions in a last two symbols of the three or more symbols allocated for uplink transmissions.

34. The non-transitory computer-readable medium of claim 31, wherein at least one symbol of the number of symbols allocated for the GP and the UpPTS associated with the first RAT network is allocated for the GP.

35. The non-transitory computer-readable medium of claim 31, wherein the second RAT network comprises time division synchronous code division multiple access (TD-SCDMA).

36. The non-transitory computer-readable medium of claim 35, wherein the first RAT network comprises Long Term Evolution (LTE) time division duplex (TDD).

37. The non-transitory computer-readable medium of claim 36, wherein for a TD-SCDMA downlink/uplink configuration of 2:4, LTE TDD special subframe (SSF) configurations comprise k:(14−k−n):n, wherein k=1, and 1≤n≤13−k, and wherein k indicates a number orthogonal frequency division multiplexing (OFDM) symbols of a downlink pilot timeslot (DwPTS) and n indicates a number OFDM symbols of a UpPTS.

38. The non-transitory computer-readable medium of claim 36, wherein for a TD-SCDMA downlink/uplink configuration of 3:3, LTE TDD special subframe (SSF) configurations comprise k:(14−k−n):n, wherein 1≤k≤10, and 1≤n≤13−k, and wherein k indicates a number orthogonal frequency division multiplexing (OFDM) symbols of a downlink pilot timeslot (DwPTS) and n indicates a number OFDM symbols of a UpPTS.

39. The non-transitory computer-readable medium of claim 36, wherein for a TD-SCDMA downlink/uplink configuration of 4:2, LTE TDD special subframe (SSF) configurations comprise k:(14−k−n):n, wherein 1≤k≤6, 1≤n≤13−k, and wherein k indicates a number orthogonal frequency division multiplexing (OFDM) symbols of a downlink pilot timeslot (DwPTS) and n indicates a number OFDM symbols of a UpPTS.

40. The non-transitory computer-readable medium of claim 36, wherein for a TD-SCDMA downlink/uplink configuration of 1:5, LTE TDD special subframe (SSF) configurations comprise k:(14−k−n):n, wherein 1≤k≤5, 1≤n≤13−k, and wherein k indicates a number orthogonal frequency division multiplexing (OFDM) symbols of a downlink pilot timeslot (DwPTS) and n indicates a number OFDM symbols of a UpPTS.

* * * * *